United States Patent
Gardner et al.

(10) Patent No.: US 8,335,801 B2
(45) Date of Patent: Dec. 18, 2012

(54) SYSTEM AND METHOD FOR MATCHING CONTENT BETWEEN SOURCES

(75) Inventors: Paul Anton Richardson Gardner, Palo Alto, CA (US); Olivier Chalouhi, Redwood City, CA (US)

(73) Assignee: Fanhattan LLC, San Mateo, CA (US)

( * ) Notice: Subject to any disclaimer, the term of this patent is extended or adjusted under 35 U.S.C. 154(b) by 125 days.

(21) Appl. No.: 12/972,280

(22) Filed: Dec. 17, 2010

(65) Prior Publication Data

US 2012/0158743 A1 Jun. 21, 2012

(51) Int. Cl.
*G06F 17/00* (2006.01)
(52) U.S. Cl. ......... 707/791; 707/802; 707/822; 707/828
(58) Field of Classification Search ........... 707/600–899
See application file for complete search history.

(56) References Cited

U.S. PATENT DOCUMENTS
2007/0234140 A1* 10/2007 Lee et al. .................. 714/715

FOREIGN PATENT DOCUMENTS
WO WO-2012/083232 A1 6/2012

* cited by examiner

*Primary Examiner* — Isaac M Woo
(74) *Attorney, Agent, or Firm* — Schwegman Lundberg Woessner P.A.

(57) ABSTRACT

In a method and system for matching content between content sources, a first set of metadata describing a first content item is compared to a second set of metadata describing a second content item. Based on the comparing, an accuracy score is generated. The accuracy score indicates an amount of similarity between the first set of metadata and the second set of metadata. The accuracy score is compared to a predetermined accuracy threshold value. Based on the accuracy score being greater than or equal to the predetermined accuracy threshold value, a determination is made that the first content item and the second content item are a match. Based on the accuracy score being less than the predetermined accuracy threshold value, a determination is made that the first content item and the second content item are not a match.

23 Claims, 5 Drawing Sheets

SYSTEM AND METHOD FOR MATCHING CONTENT BETWEEN SOURCES

TECHNICAL FIELD

Aspects of the present disclosure relate generally to media content, and more specifically, to a system and method for matching content between sources.

BACKGROUND

Currently, there exist many repositories of content. Often, these repositories store the same piece of content, but with their own metadata and identifiers. Each repository may be associated with a provider of content or a provider of metadata related to content. For example, Netflix® stores various pieces of content (e.g., movies, television shows) with metadata and identifiers that identify the content to Netflix and to users. Blockbuster Video also may store the same pieces of content with its own set of metadata and identifiers that are used to identify the content both internally and externally. Even though a piece of content stored by both entities may be the same, the metadata or identifiers used to describe or identify the piece of content may differ. In some cases, even though the substance of the piece of content may be identical, it may appear that the same content stored by both entities is two different pieces of content due to the mismatching metadata.

BRIEF DESCRIPTION OF DRAWINGS

The present invention is illustrated by way of example, and not by way of limitation, in the figures of the accompanying drawings.

DETAILED DESCRIPTION

Although the disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

In various example embodiments, a system and method to match content between content sources is disclosed. A first set of metadata describing a first content item may be compared to a second set of metadata describing a second content item. Based on the comparison, an accuracy score may be generated. The accuracy score may indicate an amount of similarity between the first set of metadata and the second set of metadata. The accuracy score may be compared to a predetermined accuracy threshold value. Based on the accuracy score being greater than or equal to the predetermined accuracy threshold value, a determination may be made that the first content item and the second content item are a match. Based on the accuracy score being less than the predetermined accuracy threshold value, a determination may be made that the first content item and the second content item are not a match.

Figure 1:
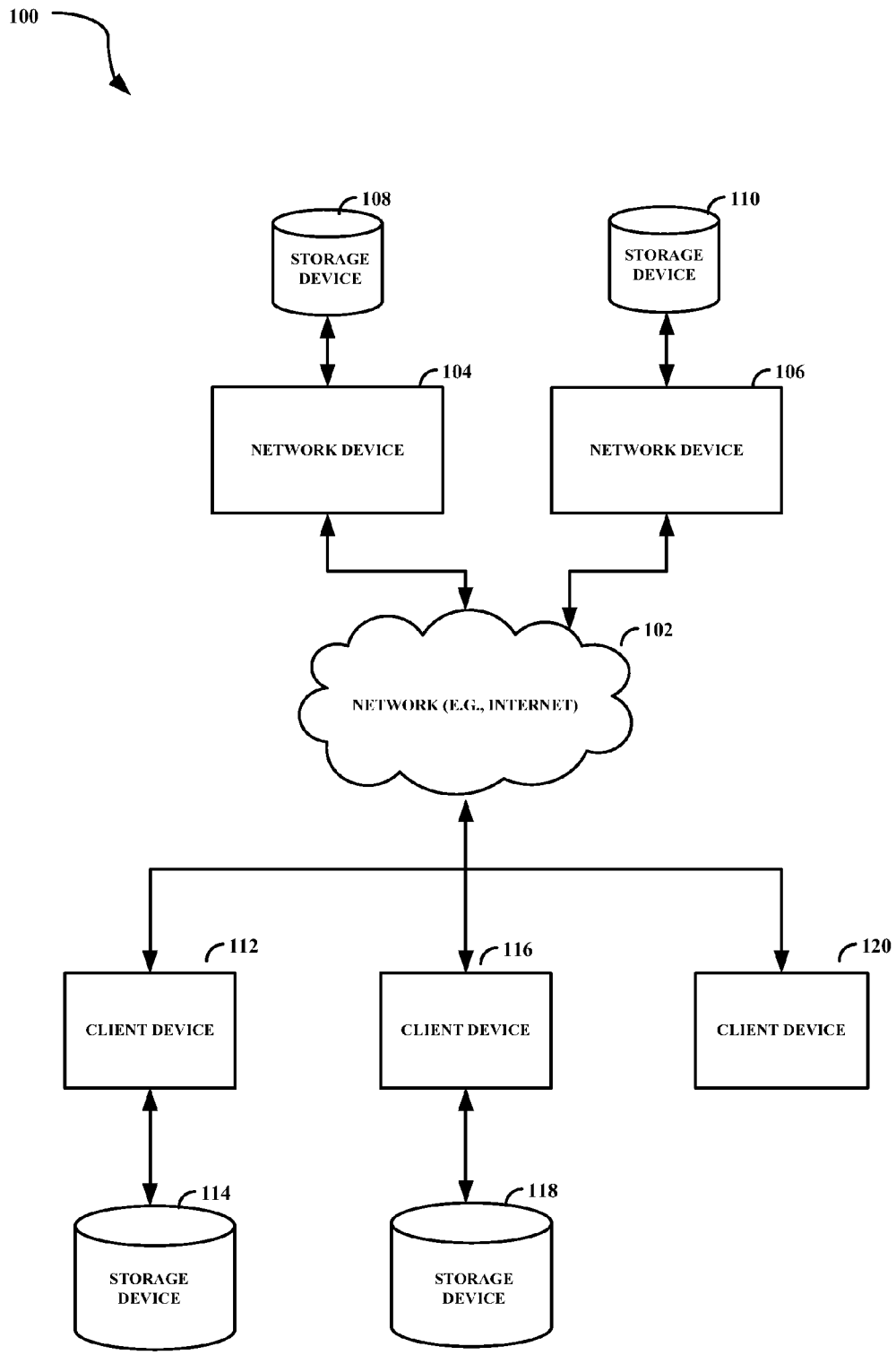
FIG. 1 is a block diagram illustrating a network system having an architecture configured for exchanging data over a network, according to an example embodiment.

FIG. 1 is a block diagram illustrating an example network system 100 connecting one or more client devices 112, 116, 120 to one or more network devices 104, 106 via a network 102. The one more client devices 112, 116, 120 may include Internet- or network-enabled devices, such as consumer electronics devices (e.g., televisions, DVD players, Blu-Ray® players, set-top boxes, portable audio/video players, gaming consoles) and computing devices (e.g., personal computer, laptop, tablet computer, smart phone, mobile device). The type of client devices is not intended to be limiting, and the foregoing devices listed are merely examples. The client devices 112, 116, 120 may have remote, attached, or internal storage devices 114, 118. One or more of the client devices 112, 116, 120 may have installed thereon and may execute a client application (not shown) that enables the client device to serve as a local media server instance. The client application may search for and discover media content (e.g., audio, video, images) stored on the device as well as media content stored on other networked client devices having the client application installed thereon. The client application may aggregate the discovered media content, such that a user may access local content stored on any client device having the client application installed thereon. The discovered media content may be stored in an aggregated data file, which may be stored on the client device. The local content may be indexed by the client device in which the content resides. The client application also may present a variety of remote sources to the user from which the user is able to download, stream, or otherwise access a particular media content item. For example, the client application may present to the user all streaming, rental, and purchase options for the media content item to the extent they exist and are available for access.

In an example embodiment, content-related data also may be stored in a database associated with the client application. The database may contain a record for each discovered content item. The record may include known or discovered metadata about the content item. As additional metadata is obtained for the content item, the corresponding database record for the content item may be updated to include the additional metadata.

One or more network devices 104, 106 may be communicatively connected to the client devices 112, 116, 120 via network 102. The network devices 104, 106 may be servers storing media content or metadata relating to media content available to be accessed by the client devices 112, 116, 120. In an example embodiment, network devices 104, 106 may include proprietary servers related to the client application as well as third party servers hosting free or subscription-based content. Additional third-party servers may include servers operating as content metadata repositories. For example, in the context of movies, third-party servers may be servers associated with themoviedb.org or other third party aggregators that store and deliver movie metadata in response to user requests. The network devices 104, 106 may include attached storage devices or may interface with databases or other storage devices 108, 110. For illustrative purposes only, the network devices 104, 106 have been shown as a single device in FIG. 1, although it is contemplated that the network devices 104, 106 may include one or more web servers, application servers, database servers, and so forth, operating in conjunction to store and deliver content via network 102.

The proprietary servers may store metadata related to media content and data that facilitates identification of media content across multiple content servers. For example, the proprietary servers may store identifiers for media content that are used to interface with third party servers that store or host the media content. The proprietary servers further may include one or more modules capable of interfacing with third-party content servers and metadata repositories.

The client application installed on one or more of the client devices 112, 116, 120 may enable a user to search for media content or navigate among categories of media content. To find media content, a user may enter search terms in a user interface of the client application to retrieve search results, or the user may select among categories and sub-categories of media content to identify a particular media content item. For each browsed content item, the client application may display metadata associated with the content item. The metadata may be retrieved from both local and remote sources. The metadata may include but are not limited to a title of the content item, one or more images or video clips related to the content item, a release date of the content item, a cast of the content item, one or more reviews of the content item, and the availability of the content item via one or more content providers.

Figure 2:
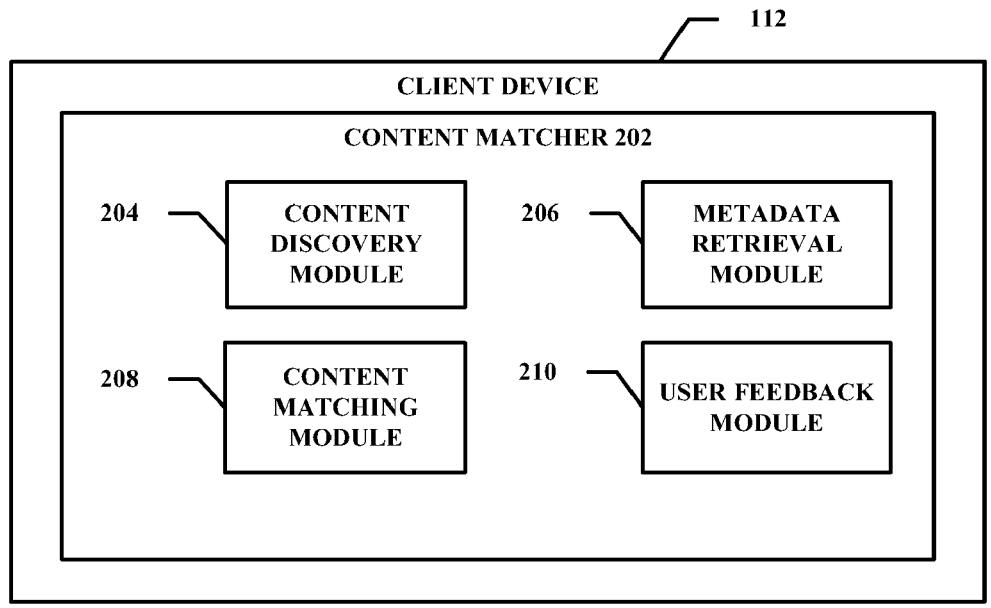
FIG. 2 is a block diagram showing modules of a content matcher, executing on a client machine or network device, according to an example embodiment.

FIG. 2 is a block diagram showing certain modules of a content matcher, executing on a client machine or network device, according to an example embodiment. Although the modules are shown in FIG. 2 as being part of a client device, it is contemplated that the modules may be implemented on a network device, such as a server. In an example embodiment, the content matcher 202 may be part of the client application discussed with reference to FIG. 1. In an example embodiment, one or more processors of the client or network device may execute or implement the modules.

The content matcher 202 includes modules, such as a content discovery module 204, a metadata retrieval module 206, a content matching module 208, and a user feedback module 210, to perform operations of an example embodiment.

The content discovery module 204 may perform various operations, including scanning a local client device 112 for video content and providing a search interface and functionality for a user to search for content. It is contemplated that the content discovery module 204 may encompass one or more modules or sub-modules that may perform the various operations described herein.

The local client device 112 may be a device on which the client application discussed with reference to FIG. 1 is installed. The content discovery module 204 also may scan other client devices 116, 120 connected to the local client device 112 via a local area network and having the client application installed thereon. The scanned content may be recorded by the content discovery module 204 and associated with the client device 112, 116, 120 from which it was recorded. Metadata associated with each scanned content item may be placed in a corresponding record in a database associated with the client application.

The content discovery module 204 further may scan the local and networked client devices at a predetermined time or at predetermined intervals of time for changes in content. In an example embodiment, the content discovery module 204 may scan each and every storage device attached to the client devices 112, 116, 120, including removable storage (e.g., external hard drives, portable USB drives) 114, 118, provided the removable storage is attached to a client device at the time of scanning. In an example embodiment, the content discovery module 204 may instead scan frequently accessed folders or designated folders.

The content discovery module 204 further may provide a search interface to a user to permit the user to search for a specific piece of content. In alternate embodiments, a different module of the client application may provide this interface. In an example embodiment, the search interface may comprise a text box to enable a user to enter information (e.g., title, subject matter, year) related to a content item. In an example embodiment, the search interface may be part of a user interface by which a user may browse and navigate among content categories and items to select a particular piece of content.

In response to a search query entered by a user via the search interface, a metadata retrieval module 206 may interface with local and remote sources to identify relevant content and retrieve the content and metadata associated with the content. The metadata retrieval module 204 may access the database associated with the client application to search for a record or records related to the search query. The records may contain metadata used to identify content items that may be relevant to the search query. The records also may include content identifiers used by the client application and by third-party content providers or metadata repositories to identify content items. The metadata retrieval module 206 may use one or more of the metadata and content identifiers to interface with third-party content providers and metadata repositories. In an example embodiment, such interfacing may entail interfacing via one or more API calls with an exposed API provided by the third party entity.

In response to a search query, the metadata retrieval module 206 may return a list of content item results that may be relevant to the query. The results may include different content items provided by one or more content providers or the same content item provided by one or more content providers. In an example embodiment, the results may be selected by the various content providers themselves based on a query passed to the content provider by the client application. In an example embodiment, the specific results returned may have been retrieved by providing content providers with one or more content identifiers used to identify specific content items.

The results obtained by the metadata retrieval module 206 may include metadata describing the content item. The metadata is created or maintained by the source of the metadata, and thus, may contain errors or inconsistencies. The metadata retrieval module 206 may store the retrieved metadata in a database record related to the content item. The database record may be part of the database associated with the client application.

The content matching module 208 may compare metadata retrieved from various sources to determine the accuracy of the metadata. The accuracy of the metadata may be relevant in order to provide accurate information to a user who is searching or navigating among content items. Because each content provider or source may store a content item with its own set of metadata, in certain instances, the metadata that describes a content item may not match across content providers. Moreover, each content provider may store a content item with its own proprietary content identifier, thereby making it difficult to cross-reference content items among providers. For example, the same movie stored at two different content providers may have different metadata associated therewith. One content provider may spell the title of the movie using American English, while the other content provider may spell the title of the movie using British English. Thus, to the client application or other computing devices, the same movie may appear to be two different movies. Another example of where metadata might mislead a client application or computing device regarding content is a situation where two content items (e.g., movies) share the same title. In one example embodiment, one content item may be a remake or reinterpretation of the other content item. In another example embodiment, one content item may be a sequel of the other content item. From examining the title of the content items, the client application may be mislead into believing that the two content items are one and the same.

The content matching module 208 may attempt to reconcile mismatching metadata among content items and content item providers, either as part of the search and retrieval process or independent of the search process. The content matching module 208 may match metadata between a variety of sources, including but not limited to, between two or more content providers, a content provider and a metadata repository, and a content provider and a local database associated with the client application discussed with reference to FIG. 1. The content matching module 208 may implement or execute a matching algorithm to determine an accuracy of the metadata.

The matching algorithm used by the content matching module 208 may use various pieces of metadata to evaluate the accuracy of a particular source's metadata. For example, in the context of movies, the matching algorithm may consider metadata such as the title, cast, crew, release date, and studio when evaluating the accuracy of metadata. In an example embodiment, the matching algorithm also may consider a plot synopsis when evaluating the accuracy of metadata. It is contemplated that other pieces of metadata may be used when evaluating the accuracy of metadata. Additionally, different types of metadata may be used depending on the type of content.

In an example embodiment, the content matching module 208 may use a matching or accuracy score to indicate a degree of similarity or matching between two sets of metadata related to two content items. In an example embodiment, the matching algorithm implemented by the content matching module 208 may assign an accuracy score of 1 to two sets of metadata. As the matching algorithm compares different pieces of metadata, the accuracy score may decrease as differences in the sets of metadata are identified. Upon completion of the analysis of the two sets of metadata, the matching algorithm may compare the accuracy score to a predetermined threshold that represents a minimum accuracy or similarity required between the two sets of metadata to characterize the two sets of metadata as describing the same content item.

In an example embodiment, the matching algorithm may assign an initial accuracy score of 0 to the two sets of metadata, with the score increasing in value as metadata in the two sets of metadata are found to match.

Examples of metadata that may be compared include, but are not limited to, the titles of the content items, the dates of release of the content items, cast members related to the content items, and publishers or originators of the content items. The above-recited examples may apply when the content items being compared are movies, but it is contemplated that other types of metadata may be compared depending on the type of content being compared. Depending on the degree of accuracy desired, more or less metadata may be considered by the content matching module 208.

In an example embodiment, individual elements of each piece of metadata may be examined as part of a more detailed analysis of the metadata. For example, as opposed to making an accuracy determination based on the entire title of a content item, the matching algorithm may analyze each word contained in the title. Each word in the respective titles of the two sets of metadata that matches may be used to increase or maintain the accuracy score, depending on the scoring scheme used, while each word in the respective titles that differs may cause the accuracy score to decrease or remain the same, depending on the scoring scheme used.

In an example embodiment, the matching algorithm may consider the degree of difference between two pieces of metadata when determining the accuracy of the two sets of metadata. For example, when comparing the dates of release for two content items, if the dates of release match, the matching algorithm may deem this particular aspect of the metadata to be accurate. If the dates of release differ by a small amount (e.g., one year, one month, a few days), the matching algorithm may decrease the accuracy score by a small amount. If the dates of release differ by a larger amount (e.g., more than one year, more than one month), the matching algorithm may decrease the accuracy score by a larger amount.

In an example embodiment, the matching algorithm may weight certain pieces of metadata more heavily than other pieces of metadata to reflect that a determination of accuracy between certain compared pieces of metadata may be more indicative of a match between content items. For example, the matching algorithm may place more weight or emphasis on a match between the titles of two content items being compared than a match between the genres of the two content items being compared.

The content matching module 208 may generate the accuracy score based on the comparison and, in certain example embodiments, weighting of certain pieces of metadata associated with two content items being compared. The accuracy score may be compared to a threshold value, which may represent a minimum amount of similarity required between the two content items to support a conclusion that the two content items match. In an example embodiment, the threshold value may be 0.6, although it is contemplated that any value may be used. If the accuracy score is greater than or equal to the threshold value, a conclusion may be drawn that the two content items do match, while an accuracy score lesser than the threshold value may lead to a conclusion that the two content items do not match.

Based on the comparison performed by the content matching module 208, one or more results pertaining to possible matches identified in response to the user's query or browsing may be presented to a user. Each result (e.g., content item) may include an accuracy score that indicates how accurate the result is relative to a known content item or to the user's query or a conclusion that indicates whether the content item is a match to a known content item or to the user's query.

The user feedback module 210 may receive user feedback, in the form of user input, in response to the presentation of the results of the content matching module 208. Because a user may be able to identify distinctions and differences in content item metadata more quickly than an algorithm, the user may be able to confirm or correct the results of the content matching module 208 quickly. User feedback may be solicited and received by the user feedback module 210 to confirm or reject the presented results. In an example embodiment, the user may confirm or reject the content item as a whole as being related to the user's query or to a verified content item. In an example embodiment, the user may confirm or reject certain pieces of metadata related to a content item. For example, if the user is presented with metadata related to a content item, the user may confirm that the title is correct and that the year of release is incorrect.

Based on the received user feedback, the content matching module 208 may refine the matching algorithm used to compare content item metadata. User feedback may indicate to the content matching module 208 which pieces of metadata are particularly relevant for determining matches among content items. In this case, the content matching module 208 may adjust the weights applied to the pieces of metadata to reflect the findings obtained from the user feedback. In other example embodiments, the user feedback may be used to refine the criteria used to determine whether two pieces of metadata are a match. For example, the user feedback may teach the matching algorithm of the differences between American English and British English spellings. To this end, the content matching module 208 may employ any of a variety of machine learning techniques and mechanisms to aid in the matching of metadata and in the refinement of the algorithm. For example, the content matching module 208 may use a neural network, a genetic or evolutionary algorithm, or other optimization routine to compute an error associated with an accuracy score (based on an initial accuracy score and user feedback), determine an average error associated with multiple accuracy scores, and refine or adjust the weights and considered factors (e.g., metadata) to minimize the error.

Figure 3:
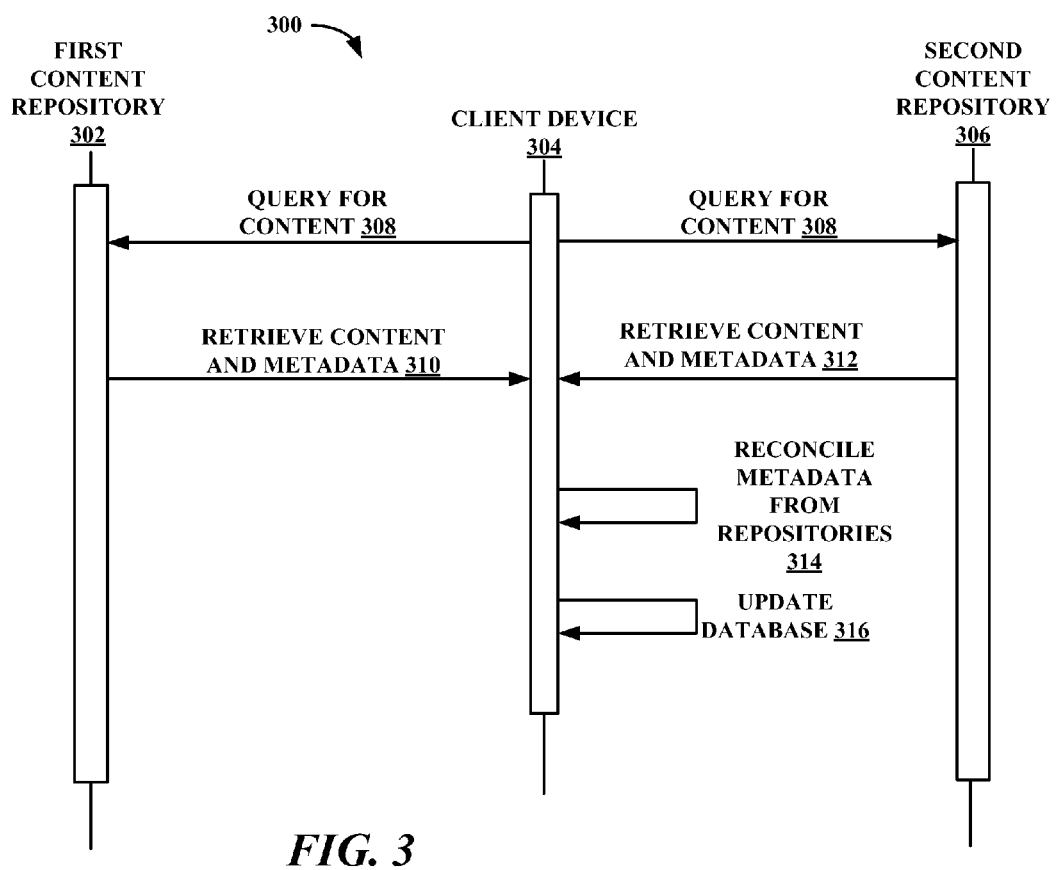
FIG. 3 is a diagram illustrating interactions between a device and content repositories, according to an example embodiment.

FIG. 3 is a diagram illustrating interactions between a device and content repositories, according to an example embodiment. In the example embodiment of FIG. 3, a client device 304 executing a client application for may receive a query for content. The client device 304 may issue queries for content or content metadata 308 to a first content repository 302 and a second content repository 306 in response to the receipt of the query. Although FIG. 3 illustrates the receivers of the queries as being content repositories, it is contemplated that any networked device (e.g., content provider, metadata repository, database, local device) may be the recipient of a query for content. The client device 304 may issue the query for content 308 using an API call to interface with an exposed API interface of the first content repository 302 or the second content repository 306. In an example embodiment, if the requested content item is known or readily identifiable, the client device 304 may issue the query using the content identifier by which the content is stored in the first and the second content repositories 302, 306. In other example embodiments, the client device 304 may issue a query containing search terms and other parameters which the first and the second content repositories 302, 306 may use to identify content items or metadata to return to the client device 304.

In response to the content query 308, first content repository 302 and second content repository 306 may provide content items and/or metadata 310 to the client device 304. The client device 304 may reconcile the metadata received from the repositories by comparing the metadata to each other or to locally stored metadata. Comparing the metadata may entail executing or implementing a content matching algorithm to compare various pieces of metadata to determine whether the metadata match. Matching metadata may indicate that the retrieved content items have the same identity, while mismatching metadata may tend to indicate that two different content items were retrieved. Further, matching metadata also may verify the identity of a content item or verify the accuracy of locally stored metadata. If metadata related to a content item is deemed accurate, in an example embodiment, the client device may update a database record 316 pertaining to the content item with the retrieved metadata.

Figure 4:
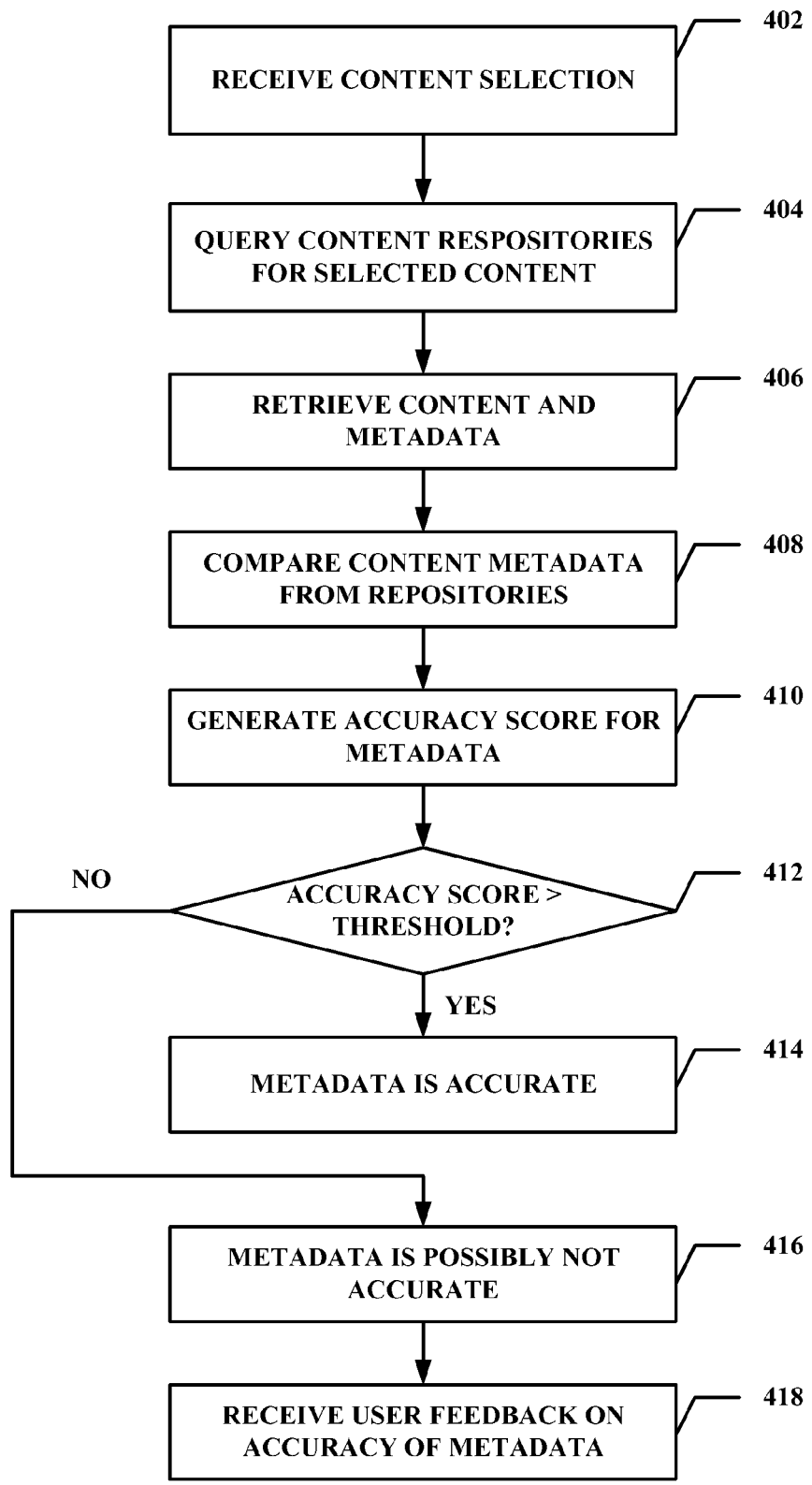
FIG. 4 is a flowchart that illustrates an example method of matching content between sources.

FIG. 4 is a flowchart that illustrates an example method of matching content between sources. At operation 402, a device may receive a content selection. The content selection may be in the form of a request for a specific content item or a query for content items matching inputted search parameters. At operation 404, the device may formulate one or more queries or requests to third party content providers, metadata repositories, or other networked devices in search of content that may fulfill the query or request. In an example embodiment, information contained in the query may be populated from user input and a local database storing records that contain metadata. The records also may store content identifiers used by the remote sources that may simplify the retrieval of content and metadata from the remote sources.

At operation 406, content items and metadata may be retrieved from the remote sources. Examples of metadata that may be retrieved include, but are not limited to, the titles of the content items, the dates of release of the content items, cast members related to the content items, and publishers or originators of the content items. The above-recited examples may apply when the content items being compared are movies, but it is contemplated that other types of metadata may be compared depending on the type of content being compared.

At operation 408, the retrieved metadata may be compared to each other or to existing metadata stored locally in the device. The comparison may be performed for certain pieces of metadata or for every piece of metadata retrieved. Comparing metadata retrieved from remote sources to each other may be performed to determine whether the content items and metadata returned from the remote sources correspond to the same content item. Comparing metadata retrieved from a remote source to locally stored metadata may be performed for the purpose of determining the identity of the retrieved content item or metadata using known or verified metadata.

At operation 410, as part of the comparison process, an accuracy score may be generated. The accuracy score may represent an overall assessment of how two sets of metadata compare. In an example embodiment, a matching algorithm implemented by the device may assign an accuracy score of '1' to two sets of metadata. As the matching algorithm compares different pieces of metadata, the accuracy score may decrease as differences in the sets of metadata are identified. Upon completion of the analysis of the two sets of metadata, the matching algorithm may compare the accuracy score to a predetermined threshold that represents a minimum accuracy or similarity required between the two sets of metadata to characterize the two sets of metadata as describing the same content item. In an example embodiment, the matching algorithm may assign an initial accuracy score of '0' to the two sets of metadata, with the score increasing in value as metadata in the two sets of metadata are found to match.

In an example embodiment, the matching algorithm may consider the degree of difference between two pieces of metadata when determining the accuracy of the two sets of metadata. For example, when comparing the dates of release for two content items, if the dates of release match, the matching algorithm may deem this particular aspect of the metadata to be accurate. If the dates of release differ by a small amount (e.g., one year, one month, a few days), the matching algorithm may decrease the accuracy score by a small amount. If the dates of release differ by a larger amount (e.g., more than one year, more than one month), the matching algorithm may decrease the accuracy score by a larger amount.

In an example embodiment, individual elements of each piece of metadata may be compared for a more detailed analysis of the metadata. For example, as opposed to comparing the entire title of a content item, each word contained in the title may be analyzed. Each word in the respective titles of the two sets of metadata that matches may be used to increase or maintain the accuracy score, depending on the scoring scheme used, while each word in the respective titles that differs may cause the accuracy score to decrease or remain the same, depending on the scoring scheme used.

In an example embodiment, the matching algorithm may weight certain pieces of metadata more heavily than other pieces of metadata to reflect that a determination of accuracy between certain compared pieces of metadata may be more indicative of a match between content items. For example, the matching algorithm may place more weight or emphasis on a match between the titles of two content items being compared than a match between the genres of the two content items being compared.

At operation 412, the accuracy score may be compared to a threshold value, which may represent a minimum amount of similarity required between the two content items to support a conclusion that the two content items match. In an example embodiment, the threshold value may be 0.6, although it is contemplated that any value may be used. If the accuracy score is greater than or equal to the threshold value, at operation 414, a conclusion may be drawn that the metadata being analyzed is accurate or that two sets of metadata being compared match. If the accuracy score is less than the threshold value, at operation 416, a conclusion may be drawn that the two content items do not match.

At operation 418, metadata found to not be accurate may be presented to one or more users. The users may input data regarding the accuracy or errors of the metadata, including confirmation of the inaccuracy of the metadata and corrections to the metadata. The user feedback may be used to refine the matching algorithm. In certain instances, user feedback may indicate which pieces of metadata are particularly relevant for determining matches among content items. Weights applied to the pieces of metadata may be adjusted based on the user feedback to reflect the data obtained from the user feedback. In other example embodiments, the user feedback may be used to refine the criteria used to determine whether two pieces of metadata are a match. For example, the user feedback may teach the matching algorithm of the differences between American English and British English spellings. A variety of machine learning and optimization techniques and mechanisms may be employed to aid in the matching of metadata and in the refinement of the algorithm. For example, a neural network, a genetic or evolutionary algorithm, or other optimization or heuristic routine may be used to compute an error associated with an accuracy score (based on an initial accuracy score and user feedback), determine an average error associated with multiple accuracy scores, and refine or adjust the weights and considered factors (e.g., metadata) to minimize the error, among other things.

Modules, Components and Logic

Certain embodiments are described herein as including logic or a number of components, modules, or mechanisms. A component or module is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component or a module may be implemented mechanically or electronically. For example, a component or a module may comprise dedicated circuitry or logic that is permanently configured (e.g., as a special-purpose processor) to perform certain operations. A component or a module also may comprise programmable logic or circuitry (e.g., as encompassed within a general-purpose processor or other programmable processor) that is temporarily configured by software to perform certain operations. It will be appreciated that the decision to implement a component mechanically, in dedicated and permanently configured circuitry, or in temporarily configured circuitry (e.g., configured by software) may be driven by cost and time considerations.

Accordingly, the term "component" or "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components or modules are temporarily configured (e.g., programmed), each of the components or modules need not be configured or instantiated at any one instance in time. For example, where the components or modules comprise a general-purpose processor configured using software, the general-purpose processor may be configured as respective different components at different times. Software may accordingly configure a processor, for example, to constitute a particular component or module at one instance of time and to constitute a different component or module at a different instance of time.

Components or modules can provide information to, and receive information from, other components or modules. Accordingly, the described components may be regarded as being communicatively coupled. Where multiple of such components or modules exist contemporaneously, communications may be achieved through signal transmission (e.g., over appropriate circuits and buses) that connect the components or modules. In embodiments in which multiple components or modules are configured or instantiated at different times, communications between such components or modules may be achieved, for example, through the storage and retrieval of information in memory structures to which the multiple components or modules have access. For example, one component or module may perform an operation, and store the output of that operation in a memory device to which it is communicatively coupled. A further component or module may then, at a later time, access the memory device to retrieve and process the stored output. Components or modules may also initiate communications with input or output devices, and can operate on a resource (e.g., a collection of information).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA (field programmable gate array) or an ASIC (application-specific integrated circuit).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination permanently and temporarily configured hardware may be a design choice. Below are set out hardware (e.g., machine) and software architectures that may be deployed, in various example embodiments.

Example Machine Architecture and Machine-Readable Medium

Figure 5:
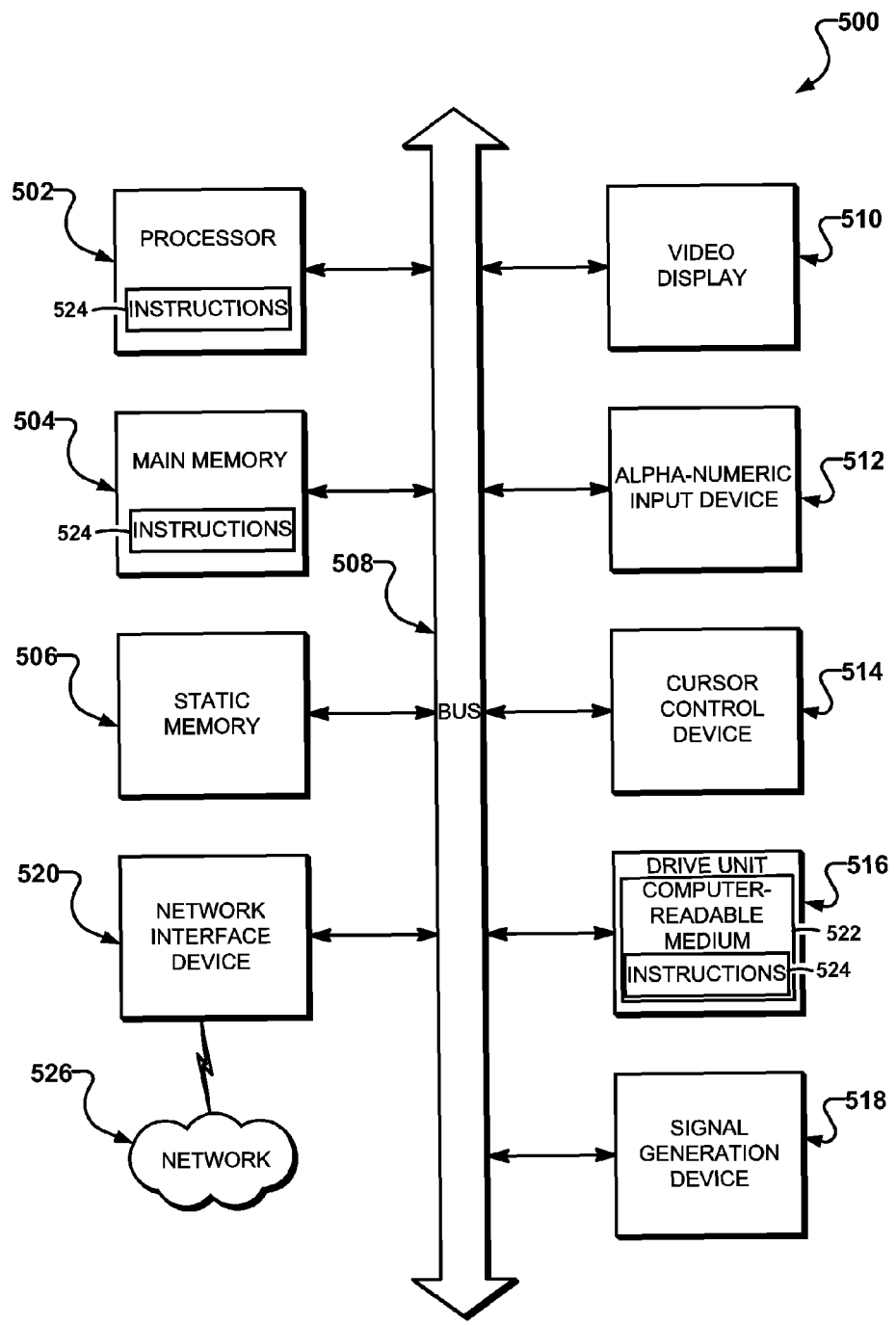
FIG. 5 shows a diagrammatic representation of a machine in the example form of a computer system.

FIG. 5 is a block diagram of machine in the example form of a computer system 500 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes at least one processor 502 (e.g., a central processing unit (CPU), a graphics processing unit (GPU) or both), a main memory 504 and a static memory 506, which communicate with each other via a bus 508. The computer system 600 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 520.

Machine-Readable Medium

The disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 524 may further be transmitted or received over a communications network 526 using a transmission medium. The software 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third storage tier may be a persistent storage medium or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, distributed or so some other suitable configuration. Further, these three tiers may be distributed between more than one computer systems as various components.

Components

Example embodiments may include the above described tiers, and processes or operations about constituting these tiers may be implemented as components. Common to many of these components is the ability to generate, use, and manipulate data. The components, and the functionality associated with each, may form part of standalone, client, or server computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server and/or client software application. Further, these APIs may be able to communicate through various distributed programming protocols as distributed computing components.

Distributed Computing Components and Protocols

Some example embodiments may include remote procedure calls being used to implement one or more of the above described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, or some other suitable configuration. Software for the components may be written using the above described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client may for example include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an Internet, Local Area Network (LAN), Wide Area Network (WAN), or some other suitable network. In some cases, Internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method to match content, the computer-implemented method comprising:

comparing, by at least one processor, a first set of metadata describing a first content item to a second set of metadata describing a second content item;

generating, by the processor, an accuracy score based on the comparing, the accuracy score indicating an amount of similarity between the first set of metadata and the second set of metadata;

comparing the accuracy score to a predetermined accuracy threshold value;

determining that the first content item and the second content item are a match based on the accuracy score being greater than or equal to the predetermined accuracy threshold value;

determining that the first content item and the second content item are not a match based on the accuracy score being less than the predetermined accuracy threshold value; and responsive to the determining that the first content item and the second content item are not a match, receiving user feedback directed to the accuracy score, the user feedback comprising at least one of a confirmation of the accuracy score, a rejection of the accuracy score, and a correction of at least one piece of metadata in the first set of metadata or the second set of metadata.

2. The computer-implemented method of claim 1, further comprising:
retrieving the first set of metadata from a first content source; and
retrieving the second set of metadata from a second content source.

3. The computer-implemented method of claim 1, further comprising:
retrieving the first set of metadata from a first content source; and
retrieving the second set of metadata from a database.

4. The computer-implemented method of claim 1, wherein the comparing of the first set of metadata to the second set of metadata comprises:
identifying each piece of metadata in the first set of metadata having a corresponding piece of metadata in the second set of metadata; and
comparing each identified piece of metadata in the first set of metadata with the corresponding piece of metadata in the second set of metadata.

5. The computer-implemented method of claim 1, wherein the generating of the accuracy score comprises:
assigning an initial value to the accuracy score; and
subtracting a predetermined amount from the initial value for each mismatching comparison of a piece of metadata in the first set of metadata with a corresponding piece of metadata in the second set of metadata.

6. The computer-implemented method of claim 1, wherein the generating of the accuracy score comprises:
assigning an initial value to the accuracy score; and
adding a predetermined amount to the initial value for each matching comparison of a piece of metadata in the first set of metadata with a corresponding piece of metadata in the second set of metadata.

7. The computer-implemented method of claim 1, wherein responsive to the determining that the first content item and the second content item are a match, adding non-overlapping metadata from the first set of metadata to the second set of metadata.

8. The computer-implemented method of claim 1, wherein the comparing of the first set of metadata with the second set of metadata is performed by the processor executing at least one of a neural network, an evolutionary algorithm, and an optimization routine.

9. A non-transitory machine-readable medium storing a set of instructions that, when executed by at least one processor, causes the at least one processor to perform operations, comprising:
comparing a first set of metadata describing a first content item to a second set of metadata describing a second content item;
generating an accuracy score based on the comparing, the accuracy score indicating an amount of similarity between the first set of metadata and the second set of metadata;
comparing the accuracy score to a predetermined accuracy threshold value;
determining that the first content item and the second content item are a match based on the accuracy score being greater than or equal to the predetermined accuracy threshold value;
determining that the first content item and the second content item are not a match based on the accuracy score being less than the predetermined accuracy threshold value; and responsive to the determining that the first content item and the second content item are not a match, receiving user feedback directed to the accuracy score, the user feedback comprising at least one of a confirmation of the accuracy score, a rejection of the accuracy score, and a correction of at least one piece of metadata in the first set of metadata or the second set of metadata.

10. The non-transitory machine-readable medium of claim 9, further comprising:
retrieving the first set of metadata from a first content source; and
retrieving the second set of metadata from a second content source.

11. The non-transitory machine-readable medium of claim 9, further comprising:
retrieving the first set of metadata from a first content source; and
retrieving the second set of metadata from a database.

12. The non-transitory machine-readable medium of claim 9, wherein the comparing of the first set of metadata to the second set of metadata comprises:
identifying each piece of metadata in the first set of metadata having a corresponding piece of metadata in the second set of metadata; and
comparing each identified piece of metadata in the first set of metadata with the corresponding piece of metadata in the second set of metadata.

13. The non-transitory machine-readable medium of claim 9, wherein the generating of the accuracy score comprises:
assigning an initial value to the accuracy score; and
subtracting a predetermined amount from the initial value for each mismatching comparison of a piece of metadata in the first set of metadata with a corresponding piece of metadata in the second set of metadata.

14. The non-transitory machine-readable medium of claim 9, wherein the generating of the accuracy score comprises:
assigning an initial value to the accuracy score; and
adding a predetermined amount to the initial value for each matching comparison of a piece of metadata in the first set of metadata with a corresponding piece of metadata in the second set of metadata.

15. The non-transitory machine-readable medium of claim 9, wherein responsive to the determining that the first content item and the second content item are a match, adding non-overlapping metadata from the first set of metadata to the second set of metadata.

16. The non-transitory machine-readable medium of claim 9, wherein the comparing of the first set of metadata with the second set of metadata is performed by the processor executing at least one of a neural network, an evolutionary algorithm, and an optimization routine.

17. A system for matching content between content sources, comprising:
a processor-implemented content matching module configured to:
compare a first set of metadata describing a first content item to a second set of metadata describing a second content item;
generate an accuracy score based on the comparing, the accuracy score indicating an amount of similarity between the first set of metadata and the second set of metadata;
compare the accuracy score to a predetermined accuracy threshold value;

determine that the first content item and the second content item are a match based on the accuracy score being greater than or equal to the predetermined accuracy threshold value; and determine that the first content item and the second content item are not a match based on the accuracy score being less than the predetermined accuracy threshold value; and a processor-implemented user feedback module configured to receive user feedback directed to the accuracy score in response to the processor-implemented content matching module determining that the first content item and the second content item are not a match, the user feedback comprising at least one of a confirmation of the accuracy score, a rejection of the accuracy score, and a correction of at least one piece of metadata in the first set of metadata or the second set of metadata.

18. The system of claim 17, further comprising a processor-implemented metadata retrieval module configured to retrieve the first set of metadata from a first content source and the second set of metadata from a second content source.

19. The system of claim 17, wherein the processor-implemented content matching module is configured to compare the first set of metadata to the second set of metadata by:

identifying each piece of metadata in the first set of metadata having a corresponding piece of metadata in the second set of metadata; and comparing each identified piece of metadata in the first set of metadata with the corresponding piece of metadata in the second set of metadata.

20. The system of claim 17, wherein the processor-implemented content matching module is configured to generate the accuracy score by:

assigning an initial value to the accuracy score; and subtracting a predetermined amount from the initial value for each mismatching comparison of a piece of metadata in the first set of metadata with a corresponding piece of metadata in the second set of metadata.

21. The system of claim 17, further comprising a processor-implemented content matching module is configured to generate the accuracy score by:

assigning an initial value to the accuracy score; and adding a predetermined amount to the initial value for each matching comparison of a piece of metadata in the first set of metadata with a corresponding piece of metadata in the second set of metadata.

22. The system of claim 17, wherein the content matching module is further configured to add non-overlapping metadata from the first set of metadata to the second set of metadata in response to the determination that the first content item and the second content item are a match.

23. The system of claim 17, wherein the processor-implemented content matching module executes at least one of a neural network, an evolutionary algorithm, and an optimization routine.

\* \* \* \* \*